United States Patent [19]

Allen

[11] Patent Number: 4,932,194

[45] Date of Patent: Jun. 12, 1990

[54] POWER OPERATED ROTARY WALKING MOWER

[76] Inventor: Dillis V. Allen, 240 Lincolnshire, Schaumburg, Ill. 60193

[21] Appl. No.: 299,020

[22] Filed: Sep. 3, 1981

[51] Int. Cl.[5] ............................................. A01D 67/00
[52] U.S. Cl. .................... 56/320.2; 56/13.4; 56/202
[58] Field of Search ................ 56/202, 203, 204, 205, 56/206, 320.2, 11.9, 13.6, 13.3, 13.4

[56] References Cited

U.S. PATENT DOCUMENTS

| | | |
|---|---|---|
| 2,779,146 | 1/1957 | Mitchell et al. ...................... 56/13.4 |
| 2,809,389 | 10/1957 | Collins et al. ......................... 56/202 |
| 2,864,226 | 12/1958 | Bright .................................... 56/13.4 |
| 2,942,396 | 6/1960 | Farnam ................................ 56/320.2 |
| 2,957,295 | 10/1960 | Brown .................................. 56/13.4 |
| 2,990,666 | 7/1961 | Blume ..................................... 56/202 |
| 3,020,693 | 2/1962 | Sears .................................... 56/320.2 |
| 3,199,277 | 8/1965 | Moody .................................... 56/202 |
| 3,220,170 | 11/1965 | Smith et al. ......................... 56/320.2 |
| 3,398,514 | 8/1968 | Nolan ..................................... 56/202 |
| 3,706,189 | 12/1972 | Rutherford ......................... 56/320.2 |
| 3,935,695 | 2/1976 | Merry .................................... 56/13.4 |
| 4,030,273 | 6/1977 | Leader ................................... 56/13.4 |
| 4,064,680 | 12/1977 | Fleigle .................................. 56/11.9 |
| 4,156,339 | 5/1979 | Dunn et al. ............................ 56/202 |
| 4,158,280 | 6/1979 | Thomas et al. ....................... 56/202 |
| 4,244,164 | 1/1981 | Szymanis .............................. 56/202 |
| 4,377,063 | 3/1983 | Leaphart ............................... 56/202 |

FOREIGN PATENT DOCUMENTS

| | | | |
|---|---|---|---|
| 2930042 | 12/1981 | Fed. Rep. of Germany ........ 56/202 |
| 2423968 | 11/1979 | France ................................ 56/320.2 |
| 1358978 | 7/1974 | United Kingdom ................. 56/202 |

*Primary Examiner*—Gene Mancene
*Assistant Examiner*—J. Hakomaker

[57] ABSTRACT

A power operated walking mower of the type having a generally cup-shaped housing with a motor supported on top of the housing and having a vertical shaft driving a rotary blade within the housing. A discharge chute extends generally tangentially in a forward direction from the left side, rather than right side, of the housing that turns upwardly and somewhat rearwardly to a discharge opening near the top and forward left side of the motor. A material receiving container, or grass bag, is connected to the end of the discharge chute an extends rearwardly over the top of the motor and then downwardly between spaced mower handle bars and is supported directly on the mower housing.

19 Claims, 5 Drawing Sheets

POWER OPERATED ROTARY WALKING MOWER

BACKGROUND OF THE PRESENT INVENTION

Over the past twenty-five years rotary mowers particularly designed for grass mowing have generally replaced reel-type mowers for residential as well as most commercial grass mowing applications for a variety of reasons. Firstly, the front and rear wheel spacing reduces mower tilting—secondly, the vertical drive shaft from the mower directly to the blade eliminates the requirement for blade driving belts, pulleys or chains required in reel-type mowers—and thirdly, the blades have only two cutting edges that simplify the sharpening of the blade.

It is important for a healthy lawn that the grass clippings be collected because if not the clippings promote lawn thatching which is a layer of dead grass and other material that forms directly above the soil that inhibits the growth of new grass and the influx of nutrients. For this reason a variety of bagging attachments have been devised for these rotary blade walking mowers, and one that has found considerable commercial success in the 1970's up until the present time is referred to as a rear-bagging system or catcher. In the rear-bagging system, a chute, generally rigid plastic or metal, extends generally tangentially rearwardly and upwardly from the right side of the cup-shaped mower housing. A material receiving container, sometimes rigid plastic and sometimes a flexible knit or woven polyester material, is positioned between and below the mower handle bars almost entirely behind the mower housing. In some cases the grass bag is supported on a rigid cross member extending between the handle bars and in others special brackets are provided for this purpose. These rear-bagging containers have capacities between less than one bushel to up to approximately two bushels maximum. The maximum limit on the bag capacity is dictated by an acceptable reduction in maneuverability of the mower that results as the bag becomes filled with grass, particularly damp grass, and of course human operator strength.

The location of the material receiving and collecting container in these rear-bagging units beneath the handle bars and behind the housing detracts significantly from the maneuverability of the mower and also reduces the quality of mower cutting as the bag becomes filled. The decrease in maneuverability results from the tendency of the material container to swing laterally as the mower is maneuvered by the operator during turning, and also since the center of gravity of the grass bag or container is considerably behind the mower housing, it tends to pivot the front wheels upwardly about the axis of the back wheels as the bag becomes filled. Since the cutting in a rotary mower occurs at the forward end of the mower housing, a slight raising of the forward wheels, along with a raising of the blade as it passes the forward part of the housing, causes the grass to be periodically cut higher at the forward end in a very uneven fashion.

Many of these rear bagging systems have high lift discharge chutes in an effort to promote complete filling of the collecting container, because the lower the discharge chute enters the collecting container the more difficult container filling becomes. These high lift chutes are rigid, usually plastic, and extend rearwardly from the housing discharge opening in a generally tangential direction with respect to the housing and upwardly at angles between 30 and 45 degrees. Flow tests on these prior chutes indicate that most of the flow in these chutes occurs in the lower right quadrant of the chute (visualize the chute cross section as being divided by two perpendicular lines). Thus, these prior attempts at rapidly elevating the material have only been partly successful because flow in the upper part of the chute is relatively low, resulting in incomplete bag filling. Moreover, to effect good container filling, it is necessary that flow speeds in these chutes exceed 4,000 feet per minute, fpm. However, in these high lift chutes, flow exceeds 4,000 fpm only in the lower quadrant of the chute and the average flow integrated over the entire chute cross-section is considerably below 4,000 fpm, in fact as much as 30% less.

Attempts have been made to improve bagging and increase the capacity of the material receiving container in rotary walking mowers, but they have not achieved any significant commercial success. An example of such a grass catching system is shown in the Nolan U.S. Pat. No. 3,398,514 in which a rear-bagging grass container is shown that fits closely around the rear end of the motor. A discharge chute extends upwardly from the right side of the right rear of the mower housing up into and through the container itself. This design is unacceptable since the chute extends almost all the way through the grass bag, decreasing bag capacity and making bag removal difficult with excessive material spillage.

The Enters, et al U.S. Pat. No. 3,708,968 shows a top-bagging material collection system in which an upwardly opening bag, supported on the handle bars, receives material from the mower through a very long upwardly and rearwardly extending discharge chute that exits above the height of the handle bars. This arrangement places far too much weight behind the mower and grass-cutting quality would be reduced even more than in present-day rear-bagging units.

The Carpenter U.S. Pat. Nos. 3,958,401 and 3,961,467 show a similar rear-bagging system in FIG. 6 that has the same disadvantages described above with respect to the Enters Patent.

The Lane U.S. Pat. No. 3,971,198, the Evans U.S. Pat. No. 3,987,606, the Carpenter U.S. Pat. No. 4,054,023, the Leader U.S. Pat. No. 4,030,273 and the Thomas U.S. Pat. No. 4,158,280 all show mowers that are similar in arrangement to the Enters mower and have the same primary disadvantage of increasing the rear offset load on the mower that tends to raise the forward end of the mower and provide very poor quality cutting.

It is a primary object of the present invention to ameliorate the problems noted above in prior rotary walking motors.

SUMMARY OF THE PRESENT INVENTION

In accordance with the present invention a rotary motor driven walking mower is provided in which the material receiving container, or grass-catching bag, is positioned over the motor to increase mower maneuverability as well as increase the capacity of the bag.

A rigid high lift discharge chute fits over a discharge opening in the left side of the mower housing and extends generally tangentially forwardly, rather than rearwardly as in conventional rotary mowers, and it has a generally rectangular cross-section with its major axis in a generally vertical longitudinal plane that is tilted slightly toward the right side of the mower. The chute has a lower section that extends upwardly at approximately a 45 degree angle and an upper section that bends approximately 90 degrees rearwardly in the same tilted plane somewhat toward the right side of the housing and ends in a discharge opening that exits above the motor near the forward left side thereof approximately 40 degrees upwardly from a horizontal plane and approximately 30 degrees with respect to a vertical plane so that the material is directed from the chute rearwardly upwardly toward the center of the bag.

The chute is constructed of a rigid material, preferably a rigid plastic, that has sufficient strength to support the forward end of the grass bag or container.

This high lift chute integrates the high flow rates over all four quadrants of the chute cross-section. More particularly, it provides flow rates above 4,000 fpm in all four quadrants of the chute cross-section at a point near the discharge end. While it is not entirely understood why this occurs, it is believed that the reverse bend of the upper chute section spreads the high flow rate in the lower outside quadrant of the lower chute section over the entire cross-section of the chute at the point of discharge into the bag. The result of this flow rate integration is that the average flow rate over the discharge cross-section is increased 15 to 20 per cent, and more importantly the flow rates in the top two quadrants of the chute discharge cross-section are increased 50 per cent or more. The dramatic increase in flow rate in the upper quadrants of the chute results in higher and more effective bag filling.

The grass bag itself includes a metal frame covered with a polyester mesh material that has flexible fiberglass deflecting panels inside its top and rear walls to assist in deflecting material from the discharge chute into the main reservoir of the bag. The bag is generally L-shaped in configuration and has an inlet fitting that releasably attaches to the end of the discharge chute. A rectangular frame is fixed to the inlet fitting and extends rearwardly upwardly at an angle of 30 degrees to define part of the top wall of the bag that serves to deflect material exiting from the chute at an angle of approximately 40 degrees with respect to a horizontal plane. The bag has a forward portion defined by the frame that extends rearwardly over the top of the motor. Just behind the motor the top wall bends to a horizontal plane over the rear portion of the bag and this part of the top w 11 also assists in turning the exiting flow pattern toward a horizontal direction. The rear bag portion extends vertically downwardly directly behind the motor and between the handle bars and rests and is supported in part on the rear part of the mower housing. The rear portion has upper side walls contiguous with the side walls of the forward portion spaced further apart than the handle bars to increase bagging capacity, and lower more narrowly spaced side walls so that they can fit between and be guided by the handle bars themselves.

The center of gravity of the present "over and topbagging" mower is, because of the configuration of the bag, forwardly of the axis of the rear wheels so there is no tendency of the bag even when fully filled, to pivot the front wheels upwardly about the axis of the back wheels as in all rear-bagging systems presently known. The enlargement of the bag over the handle bars provides a significant increase in bag capacity over present rear-bagging units which must fit entirely between the handle bars to permit top or bottom removal of the bag.

The bag is easily removed for emptying by the operator by merely releasing the bag inlet from the discharge chute and a hanger which supports the rear end of the bag, permitting it to be lifted upwardly away from the mower.

An important aspect of the present invention is that the portion of the bag over the motor serves not only to collect grass and increase the capacity of the bag (as well as shifting the center of gravity forwardly) but it also deflects the material downwardly as well as rearwardly reducing the severity of bending in the discharge chute, and hence reduces the likelihood of clogging in the discharge chute, which of course is a concern in all bagging systems. The capability of the present bag to be larger than existing bags without detracting from its maneuverability can easily yield a three bushel or more bag compared to the present two and one-half bushel maximum capacity in rear-bagging systems. While the bag capacity may be increased over three bushels by raising the height of the bag somewhat, the maximum bag limit size is dictated by the ability and strength of the average operator to handle the increased filled bag weight.

DETAILED DESCRIPTION OF THE PREFERRED EMBODIMENT

Figure 1:
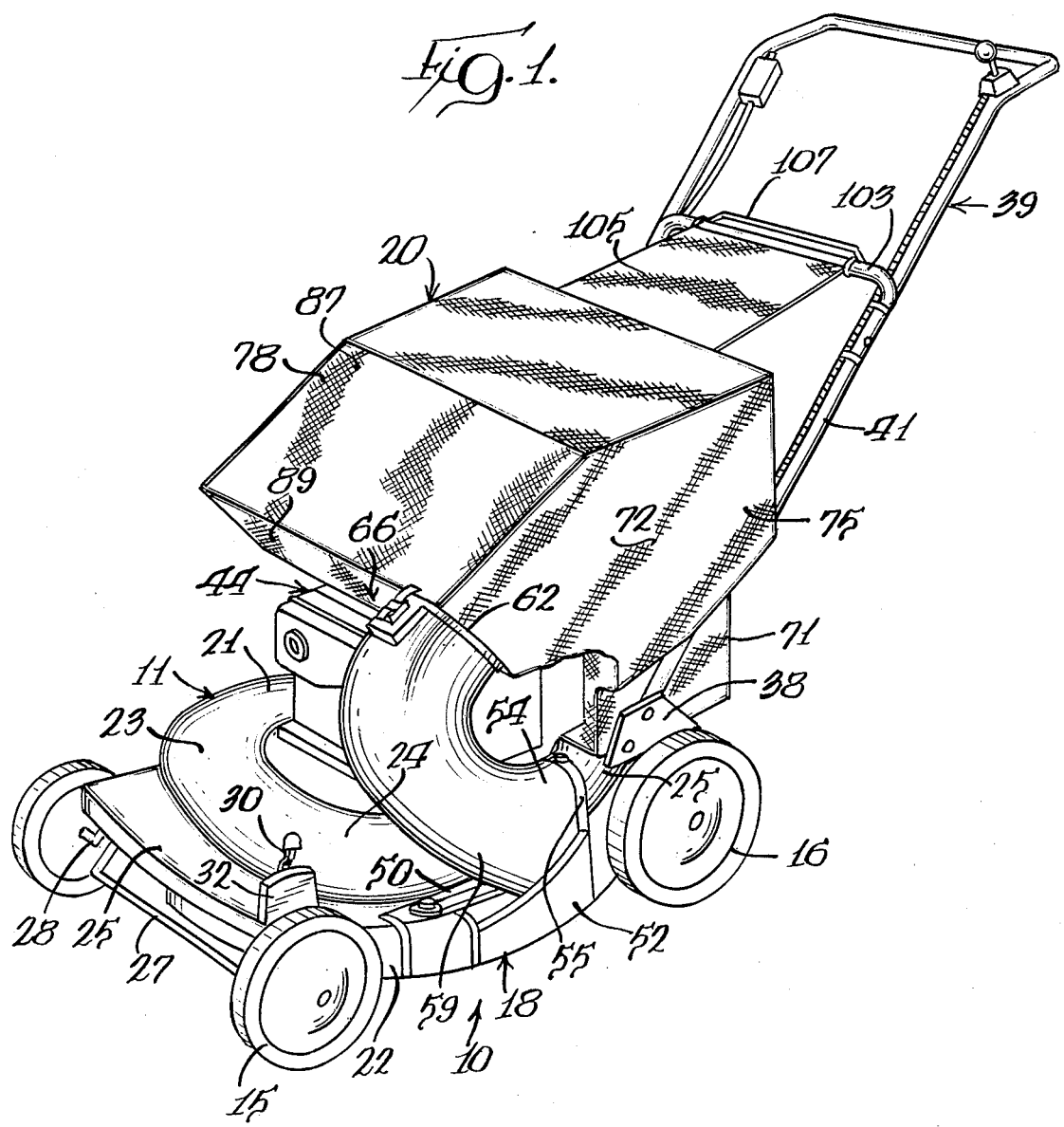
FIG. 1 is a perspective view of a rotary walking mower according to the present invention.

Viewing the drawings, a rotary walking mower 10 according to the present invention is illustrated consisting generally of a cup-shaped housing 11 supported on forward and rear wheels 15 and 16, a rigid discharge chute assembly 18 and a generally L-shaped grass receiving and collecting container or bag 20.

The housing 11 is a rigid metal casting or forging and for example may be an aluminum alloy die casting. The housing 11 is generally cup-shaped in configuration and has an annular vertical side wall 22 and a generally circular top wall 23. The top wall 23 has an upwardly extending scroll 21 beginning at point 24 just forwardly of the discharge chute 18 that extends around the wall 22 more than 300 degrees to a scroll discharge opening 26 at the left side of the deck somewhat rearwardly from the deck centerline (See FIGS. 1 and 3).

Figure 2:
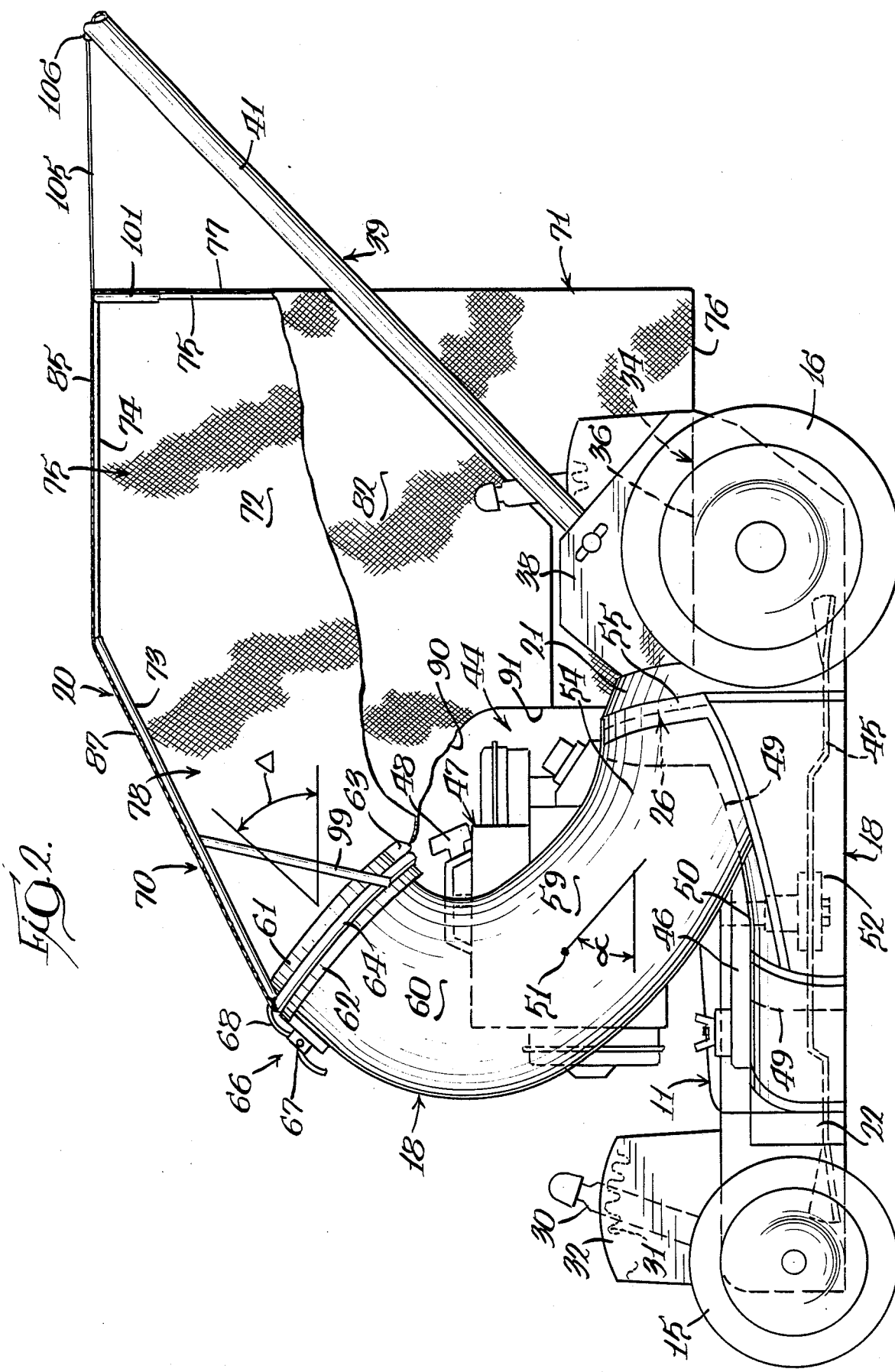
FIG. 2 is a side view of the rotary walking mower according to the present invention with the front wall partly broken away to illustrate the bag inlet.
Figure 3:
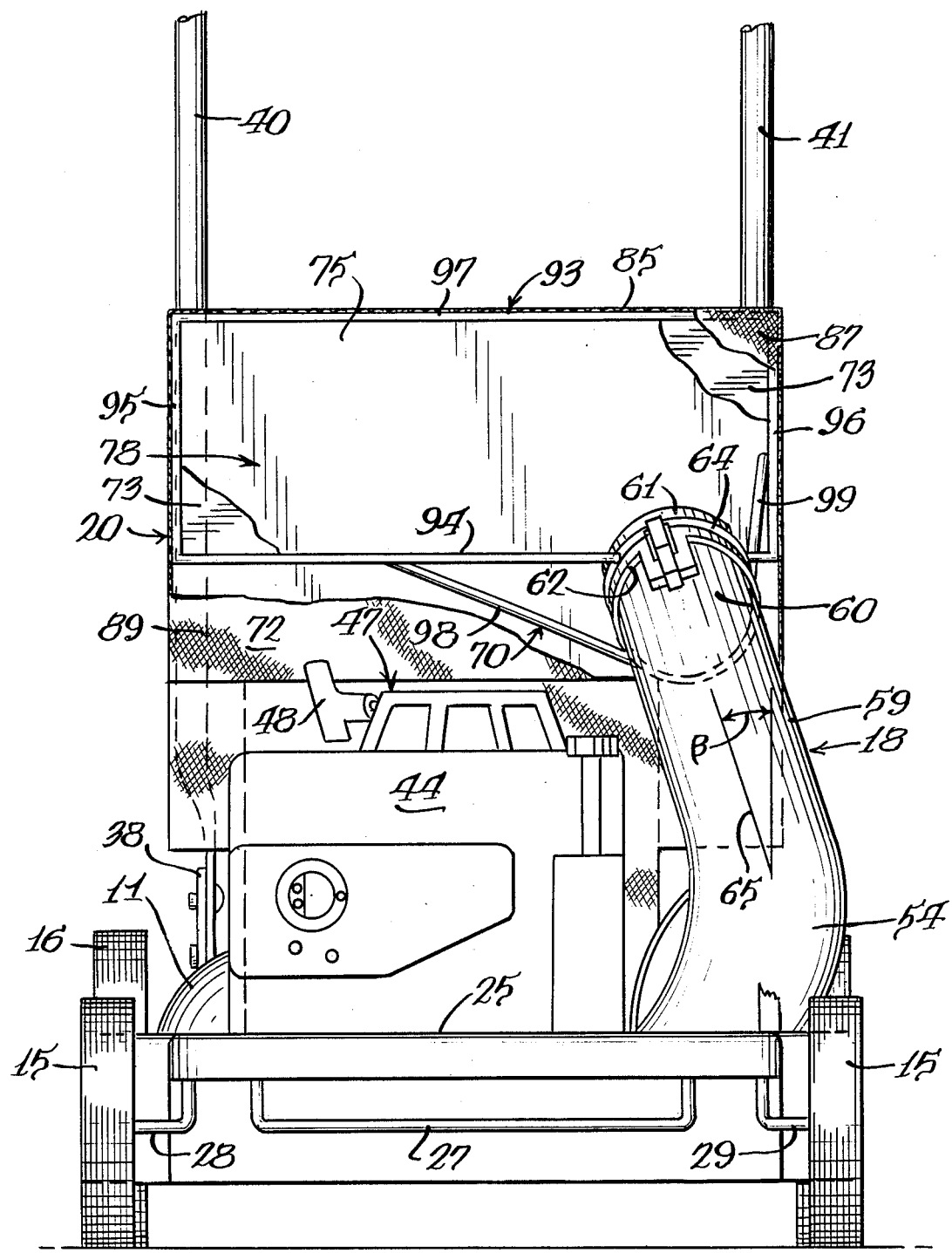
FIG. 3 is a front view of the rotary walking mower according to the present invention.

As seen clearly in FIG. 1 and 3, the housing 11 includes a substantially flat forwardly extending wheel support deck 25 that has downwardly extending lugs (not shown) that pivotally support a front-wheel cradle 27. Cradle 27 carries axle portions 28 and 29 that rotatably support front wheels 15. Cradle 27 is pivotally adjusted by a latch bar 30 that latches in one of a plurality of grooves 31 in a support 32 (See FIG. 2 and 4) that extends integrally upwardly from front deck 25. By adjusting the latch bar 30 in the desired groove, the height of both front wheels 15 may be adjusted simultaneously which along with a similar adjusting mechanism for the rear wheels adjust the cutting height of the mower blade.

Figure 5:
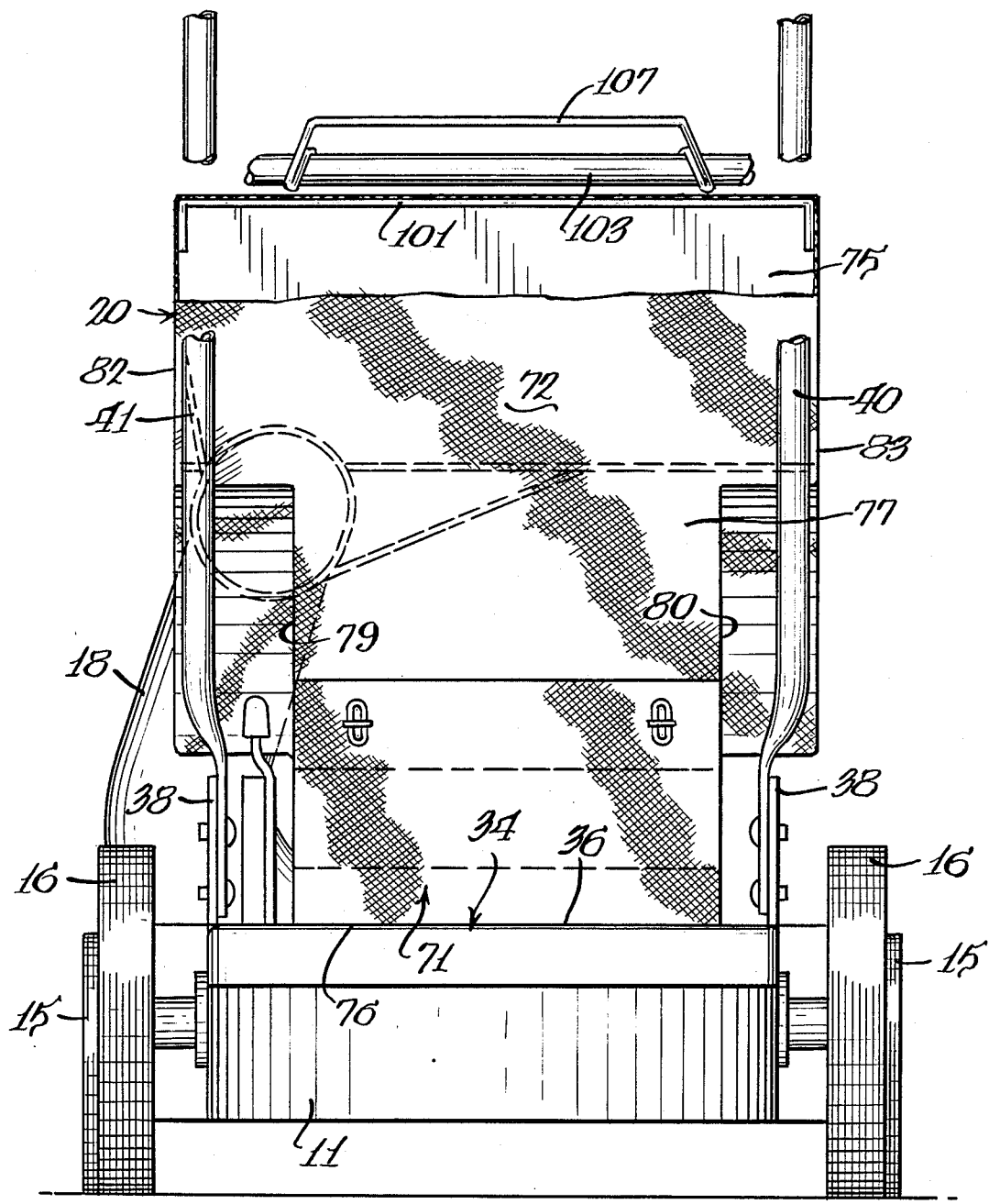
FIG. 5 is a rear view of the rotary walking mower according to the present invention.

The housing 11 includes a integral rear deck 34 as shown in FIGS. 2 and 5 that has a generally flat central planar surface 36 and spaced upstanding integral handle bar flanges 38. A cradle (not shown) similar to the cradle 27 supporting the front wheels 15, is pivotally supported to and underneath the rear deck 34 to adjustably position and support rear wheels 16.

A handle-bar assembly 39 is provided that includes spaced bars 40 and 41 having lower ends that are adjustably pivotally connected to the rear deck flanges 38.

A motor 44 is provided for rotating a two-edged conventional blade 45 mounted within the housing 11. In this case the motor is a vertically shafted four-cycle internal combustion engine, but it should be understood that the motor could be a two-cycle engine or even an electric motor. Motor 44 has a vertical drive shaft 46 as shown in FIG. 2 drivingly connected to blade 45. Motor 44 has a recoil starting mechanism 47 with a horizontally actuable manual handle 48. The horizontal actuation of recoil mechanism 47 prevents any interference with the bag 20. The motor 44 is provided with an electric starting system conventionally found in many walking mowers today.

Figure 4:
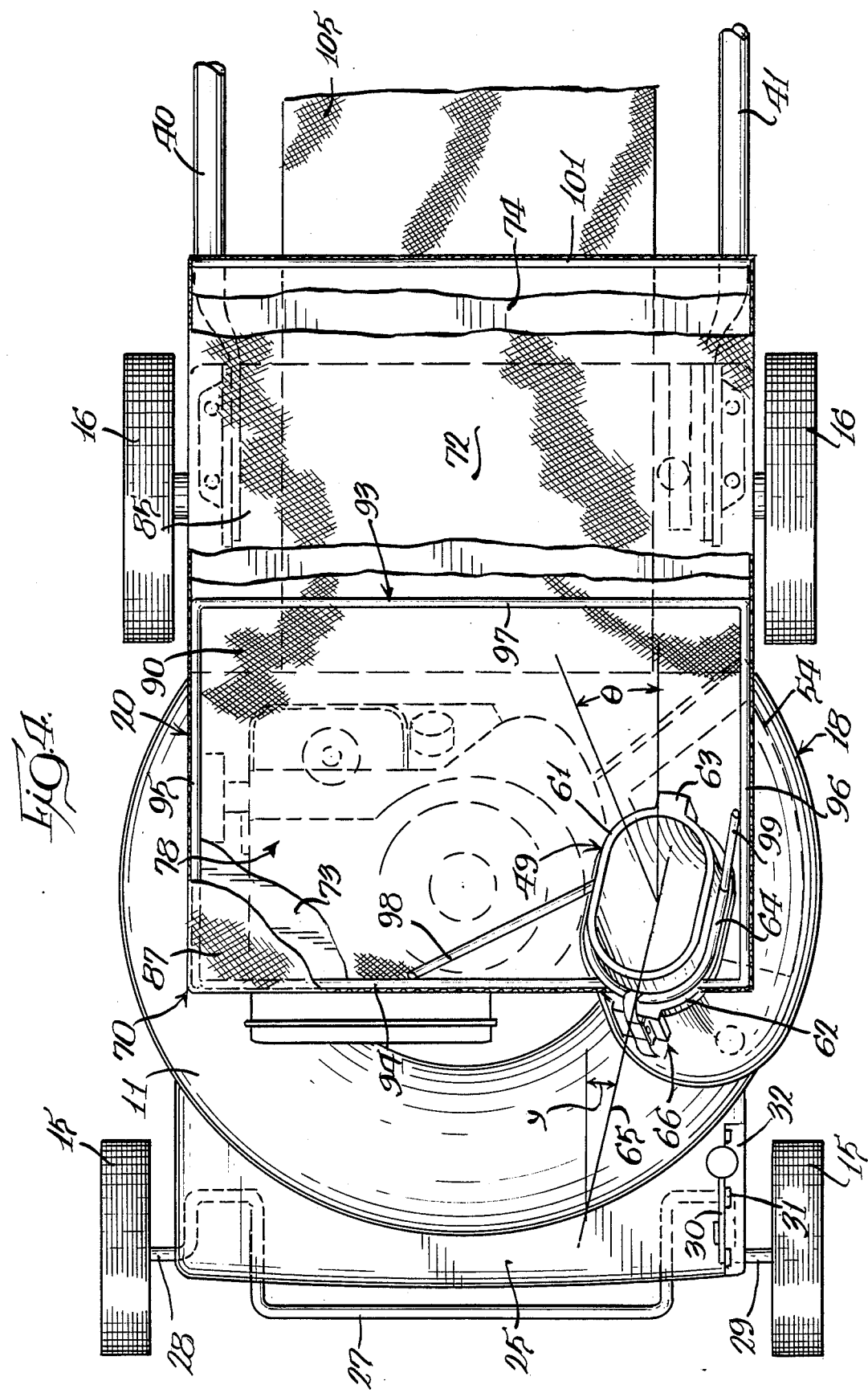
FIG. 4 is a top view of the rotary walking mower according to the present invention.

Chute 18 is a one-piece rigid plastic molding preferably made from a shock resistant copolymer and has a lower adapter section 48 fastened to housing 11 as seen clearly in FIG. 2 that encloses an opening 49 in the side wall 22 that extends into top wall 23 as seen by the dotted lines in FIGS. 2 and 4. Opening 49 is positioned on the left side of housing 11 passing over both sides of a vertical plane transverse to the mower and passing through the axis of the crankshaft of motor 44, with a major portion of the opening 49 being located rearwardly of that plane. Chute adapter 48 has a top wall 50 that covers the portion of opening 49 in the housing top wall 23 and vertical portion 52 integral therewith that covers the side of the opening 49 in the housing wall 22. Adapter section 48 has a discharge segment 54 that extends about 20 degrees inside a line tangent to the housing (see FIGS. 2 and 4). The adapter 48 has an integral peripheral inlet flange 55 that fits over the discharge end 26 of the deck scroll discharge 26.

Chute 18 includes a lower section 59 connected to adapter portion 54 and an upper section 60 that have identical inner wall cross-sections. This inner wall is rectangular with large radius corners with a major length of 6.2 inches and a minor length of 4.2 inches. The major length may be conveniently defined by a major axis line bisecting the chute cross-section and this line lies in a common plane for both the lower section 59 and the upper section 60. This common plane is generally vertical and generally longitudinal with respect to the mower direction of travel but is tilted in two directions as indicated by the lines 65 in FIGS. 3 and 4. Firstly the common plane is tilted about 20 degrees (angle $\beta$) to the left of a vertical longitudinal plane when viewed from the front of the mower in FIG. 3, and secondly tilted about 15 degrees (angle $\gamma$) clockwise from the same vertical longitudinal plane when viewed from the top in FIG. 4. The common plane for the major axis of the chute minimizes chute bending.

As seen in FIG. 2, the lower chute section 59 is substantially straight and extends upwardly from the adapter section 54 at an angle of about 45 degrees (angle $\alpha$) with respect to a horizontal plane transverse to the plane of FIG. 2.

The lower chute section 59 ends at point 51 in FIG. 2 and then the upper chute section 60 begins. The upper chute section 60 is as described above coplanar with the lower chute section 59 and bends upwardly and rearwardly therefrom slightly less than 90 degrees.

The upper end of the curved section 60 defines the discharge opening 61 of the chute and is seen in the drawings to have an integrally formed peripheral flange 62 that receives and locates a generally oval bag inlet rod 64. A projection 63 is located only at the bottom of opening 61 while flange 62 extends completely around. Rod 64 is held between the flange 62 and projection 63 on the chute by a latching mechanism 66 that has a toggle link 67 with a hook portion 68 on the end thereof that fits over the inlet rod 64 to hold it firmly in position.

With this geometry of the chute, the main chute discharge 61 directs flow approximately 47 degrees upwardly (angle $\Delta$ in FIG. 2) with respect to a horizontal plane transverse to the plane of FIG. 2 and approximately 30 degrees (angle $\theta$ in FIG. 4) from a vertical longitudinal plane toward the center of the bag 20 as seen in the plane of FIG. 4.

The material receiving and collecting container 20 is generally "L" shaped and includes a frame assembly 70 surrounded by a previous polyester mesh material cover 72. The inner top and rear surfaces of the mesh carry fiberglass panels 73, 74 and 75 (FIGS. 2 and 4) to aid in deflecting the material exiting from the discharge chute 18 into the main reservoir of the bag 20.

The bag 20 includes a lower rear portion 71 that fits between the handle bars 40 and 41 and rests on rear deck 34, an enlarged upper rear portion 69 vertically above the lower portion 71 having a width greater than the handle bars 40 and 41, and a forwardly directed portion 78 that extends almost completely over and spaced above the motor 44.

The outer configuration of the bag 20 is defined by a bottom wall 76 that rests and is supported directly on the rear deck housing surface 36, a flat rear wall 77, reduced parallel lower side walls 79 and 80 that are spaced to fit between the handle bars 40 and 41 (See FIG. 5), parallel upper side walls 82 and 83 that are spaced apart slightly greater than the handle bars 40 and 41, a generally horizontal top wall segment 85, a downwardly directed forward top wall segment 87 that angles downwardly and forwardly at an angle of approximately 30 degrees with respect to a horizontal plane, a forward wall 89 that extends downwardly and rearwardly at an angle of approximately 39 degrees with respect to a horizontal plane, a forward portion bottom wall 90, and a rear portion vertical forward wall 91. Side walls 82 and 83 turn inwardly to the lower side walls 79 and 80 along a line just above and parallel to the handle bars 40 and 41.

The frame assembly 70 includes the oval inlet fitting 64 and a rectangular frame 93 welded thereto that extends upwardly and rearwardly therefrom at an angle of 30 degrees with respect to a horizontal plane. Frame 93 includes a front rod 94, side rods 95 and 96, and rear rod 97 that together support the entire forward portion 78 of the bag 20. Bracket rods 98 and 99 are welded at their lower ends to fitting 64 and at their upper ends to rods 94 and 96 respectively to stabilize the frame 93 on the chute 18.

An elongated "U" shaped spreader rod 101 is sewed in the upper rear of bag 20 to maintain the back of the bag fully open.

The rear end of the bag 20 is held in the proper vertical position on handle cross-bar 103 by a rearwardly extending mesh web 105 that has a rear loop that receives a rod 106 of a hanger 107 that releasably fits over handle-bar cross-member 103.

The top wall portion 87 of the bag 20 extends over and is supported by frame 93 and angles upwardly and rearwardly and carries fiberglass panel 73 on its inside surface to assist in deflecting material exiting from chute outlet 61. Since material exiting from chute outlet 61 is directed upwardly at an angle of approximately 47 degrees, the 30 degree position of the panel 73 causes material to deflect off panel 73 toward a more horizontally directed path. Material deflected from panel 73 impinges on fiberglass panel 74 mounted inside the top wall portion 85 which in turn further deflects the flow of material from an upward direction toward a rearward horizontal direction. Material deflecting off fiberglass panels 73 and 74 impinges against fiberglass panel 75 that extends along and is carried by the inner surface of the rear wall 77.

The panels 73, 74 and 75 thus serve to turn the flow exiting from the outlet chute and direct it into the main bag portions 69 and 71. Since the fiberglass panels 73, 74 and 75 turn the flow path approximately 45 degrees forward horizontally and then 90 degrees downwardly, the required bending of the chute 18 is minimized, significantly reducing the likelihood of clogging of damp grass within the main chute.

The enlargement of the side walls 82 and 83 above the handle bars 40 and 41 significantly increases the capacity of the bag 20 although smaller capacity versions could have more narrowly spaced side walls 82 and 83.

The center of gravity of the bag portion 71 is slightly to the rear of the axis of the rear wheels 16, but the centers of gravity of both the upper enlarged bag portions 69 and 78 are forwardly of the rear wheel axis so that the center of gravity of the entire bag is somewhat forwardly of the rear wheel axis, thereby providing greatly improved manueverability and larger bag capacity.

I claim:

1. A power operated walking mower, comprising; a generally cup shaped housing, wheels supporting the housing for rolling motion including a pair of rear wheels, operator handle means extending rearwardly from the housing, a blade mounted for rotation about a vertical axis in the housing and having drive means extending through the housing, an internal combustion engine mounted on top of housing drivingly connected to the blade drive means, chute means connected to receive material from the housing and extending upwardly adjacent the internal combustion engine and having an outlet, said chute means having a forwardly extending first portion upwardly spaced from the housing and a rearwardly extending second portion upwardly spaced from the housing projecting over the top of the internal combustion engine, and a material receiving container connected to the outlet of the chute means to receive and collect material from the chute means, said material container having a first portion extending upwardly from a line substantially below the top of the rear end of the internal combustion engine and a second portion communicating with the first portion and extending forwardly to a line substantially forwardly of the rear of the internal combustion engine whereby the center of gravity of material container is located more closely to the center of gravity of the mower to facilitate mower handling with the material container attached.

2. A power operated walking mower as defined in claim 1, wherein the first portion of the material container extends vertically upwardly and the second portion thereof extends horizontally forwardly.

3. A power operated walking mower as defined in claim 1, wherein the second portion of the material container extends over substantially the entire engine.

4. A power operated walking mower as defined in claim 1, wherein the first portion of the material container engages and is supported on the housing.

5. A power operated walking mower as defined in claim 1, wherein said chute means has a second portion extending upwardly and rearwardly with respect to the direction of forward travel of the mower and with said outlet terminating at the forward end of the material container second portion.

6. A power operated walking mower as defined in claim 1, wherein the housing has a support portion for the rear wheels, said operator handle means including a pair of spaced handle bars extending upwardly from the support portion, said first portion of the material container having a lower end extending between the handle bars and engaging and supported on the housing support portion, said first portion of the material container having an upper end with a greater width than the handle bars spacing to increase the capacity of the container, said second portion of the material container having a width and height substantially the same as the upper end of the first portion thereof.

7. A power operated walking mower and material collecting container assembly, comprising; a generally cup-shaped housing, an internal combustion engine supported on the housing drivingly connected to a rotary blade within the housing, a handle means extending upwardly from the rear end of the housing to permit manual manipulation of the mower, chute means connected to the housing having a first portion upwardly spaced from the housing extending generally tangentially and generally forwardly with respect to the housing, said chute means having a second portion upwardly spaced from the housing extending upwardly from and communicating with the first portion terminating in an end extending over the top of the internal combustion engine, and a material receiving and collecting container connected to the end of the chute means, said material container having at least a portion thereof extending over the internal combustion engine to position the center of gravity of the material container more closely to the center of gravity of the mower.

8. A power operated walking mower and material collecting container assembly as defined in claim 7, wherein the chute means second portion end extends generally rearwardly with respect to the housing.

9. A power operated walking mower and material collecting assembly as defined in claim 7, wherein the material container has a first portion extending generally vertically upwardly from the housing at the rear thereof, and having a second portion communicating with the first portion and extending forwardly over the engine to the chute means.

10. A power operated walking mower and material collecting container assembly as defined in claim 9, wherein the first portion of the material container is supported on the rear of the housing.

11. A power operated walking mower and material collecting container assembly as defined in claim 9, wherein the handle means includes spaced handle bars, said first portion of the material container being sized to fit between and be guided by the spaced handle bars.

12. A power operated walking mower and material collection container assembly as defined in claim 9, wherein the chute means end is positioned to direct material in a generally rearward direction with respect to the housing, said second portion of the material container extending over the engine having an inlet opening at the forward end thereof connected to the chute means end.

13. A power operated walking mower and material collecting container assembly, comprising; a generally cup-shaped housing, an internal combustion engine supported on the housing drivingly connected to a rotary blade within the housing, handle bar means extending upwardly from the rear end of the housing to permit manual manipulation of the mower, chute means connected to the housing having a first portion upwardly spaced from the housing extending generally tangentially and generally forwardly with respect to the housing, said chute means having a second portion spaced above the housing extending upwardly from and communicating with the first portion, said chute means having a third portion extending generally upwardly, rearwardly and toward the right side of the housing above the internal combustion engine, a material receiving and collecting container having a first portion supported on the rear of the housing extending vertically upwardly and a second portion communicating with the first portion and extending forwardly over the internal combustion engine, said second portion of the material container having a transverse forward wall that extends downwardly and rearwardly, and an inlet in the forward wall of the material container connectable to the third portion of the chute means.

14. A power operated walking mower and material collecting container assembly, comprising; a generally cup-shaped housing, an internal combustion engine supported on the housing drivingly connected to a rotary blade within the housing, handle bar means extending upwardly from the rear end of the housing to permit manual manipulation of the mower, chute means connected to the housing having a first portion spaced above the housing extending generally tangentially and generally forwardly with respect to the housing, said chute means having a second portion spaced above the 45 housing extending upwardly form and communicating with the first portion, said handle bar means including spaced handle bars, a material receiving collecting container connected to the chute means having a first portion engaging and supported on the rear of the housing and extending upwardly therefrom, said first portion having generally flat side walls extending between the handle bars, said material container having a second portion communicating with the first portion and extending further upwardly therefrom, said second portion having generally flat side walls spaced further apart than the side walls on the first portion, said material container having a third portion communicating with the second portion and extending forwardly over the internal combustion engine, said third portion having side walls contiguous with the side walls of the second portion of the material container, and an outlet fitting in the third portion connectable to the second portion of the chute means.

15. A power operated walking mower, comprising; a generally cup-shaped housing, wheels supporting the housing for rolling motion including a pair of rear wheels, a blade mounted for rotation about a vertical axis in the housing and having drive means extending through the housing, motor means mounted on top of the housing drivingly connected to the blade drive means, chute means connected to receive material from the housing and extending upwardly adjacent the motor means, said chute means having an outlet positioned forwardly of the rear of the motor means, and a material receiving container connected to the outlet of the chute means to receive and collect material from the chute means, said material container having a first portion extending upwardly from a line substantially below the rear end of the motor means and a second portion communicating with the first portion and extending forwardly to a line substantially forwardly of the rear of the motor means, said first portion having substantial parallel forward and rear vertical walls, said second portion of the material receiving container having an inlet fitting adjacent its forward end that is releasably connectable to the chute means outlet.

16. In a walking mower of the type having a housing with a rotary cutting blade thereon that is driven in rotation from a motor mounted on top of the housing, with handle means extending almost entirely rearwardly from the housing, and with an opening in the housing to permit discharge of cut material from the housing, an improved chute connectable over the housing opening for conveying material to a material collecting container, comprising; a first portion adapted to fit over the housing opening, a second portion connected to the first portion and extending above the housing upwardly and forwardly with respect to the housing at an angle greater than thirty degrees with respect to a horizontal plane and in a generally tangential direction with respect to the housing, and a third curved portion connected to and communicating with the second portion and extending generally back toward the first portion, said third portion having an outlet adapted to receive the material collecting container.

17. In a walking mower of the type having a housing with a rotary cutting blade thereon that is driven in rotation from a motor mounted on top of the housing, with handle means extending almost entirely rearwardly from the housing, with an opening in the housing to permit discharge of cut material from the housing, and with a discharge chute having an outlet positioned forwardly of the rear end of the motor, an improved material collector adapted to be connected to the outlet of the discharge chute, comprising; a first portion having sufficient vertical height to extend substantially below and above the rear end of the motor, said first portion having substantially parallel forward and rear vertical walls, a second portion connected to and communicating with the first portion and extending horizontally forwardly of sufficient length to extend over a substantial portion of the motor, and an inlet fitting positioned at the forward end of the second portion adapted to be releasably connected to the chute outlet.

18. In a walking mower as defined in claim 17, including rectangular frame means connected to the collector inlet fitting and extending rearwardly and upwardly at an angle of approximately thirty degrees, said collector having a panel over the frame that deflects material from the chute into the first portion of the collector.

19. In a walking mower as defined in claim 17, wherein the first portion of the collector has a lower section with a reduced width compared to the other portions of the collector sized to fit between the mower handle means.

* * * * *